May 7, 1935.    C. T. HOFFMAN    2,000,023
ICE CREAM FREEZER FOR REFRIGERATORS
Filed July 11, 1932    4 Sheets-Sheet 1
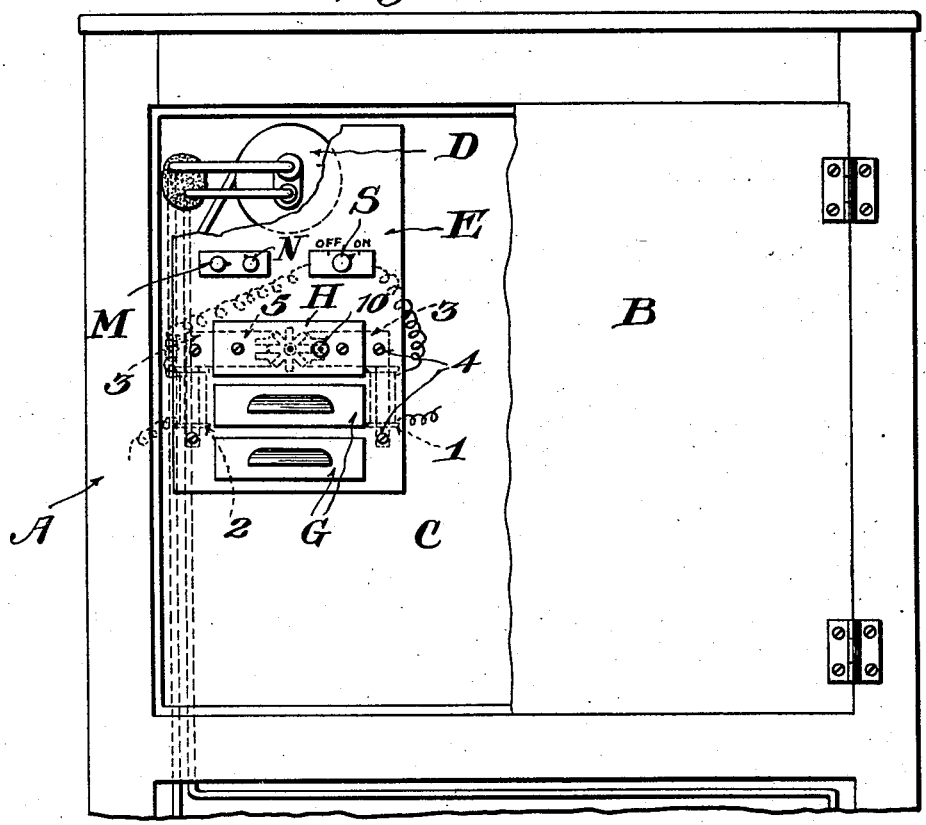
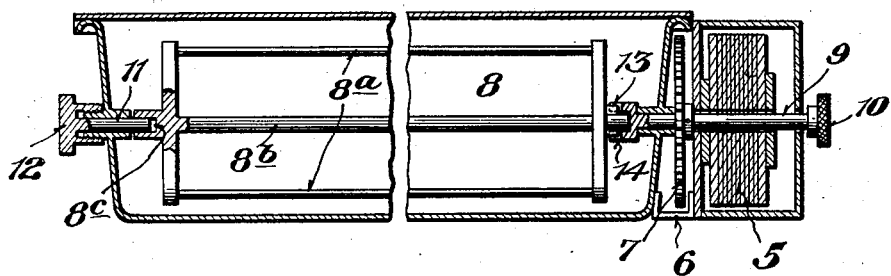
Inventor
Charles T. Hoffman, May 7, 1935.　　　C. T. HOFFMAN　　　2,000,023
ICE CREAM FREEZER FOR REFRIGERATORS
Filed July 11, 1932　　　4 Sheets-Sheet 2
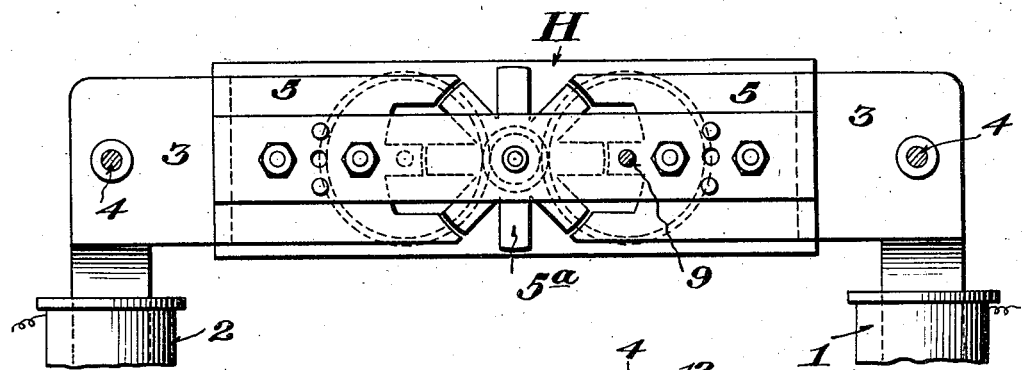
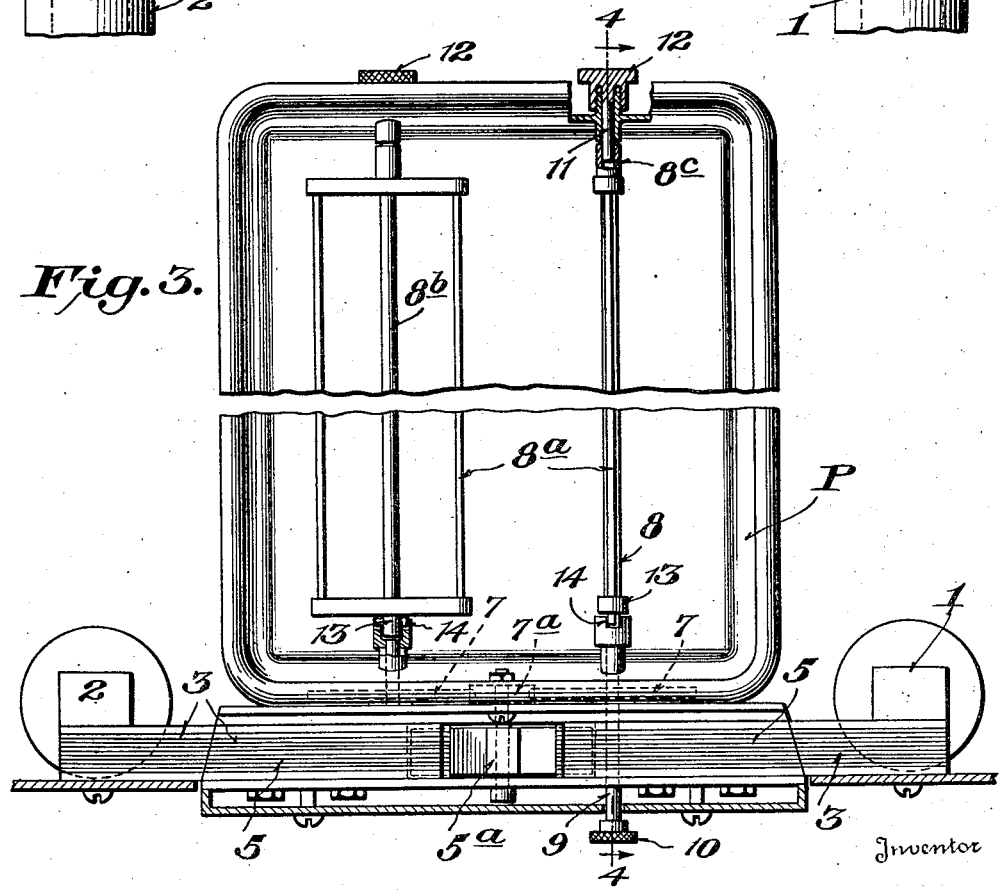
Inventor
Charles T. Hoffman,

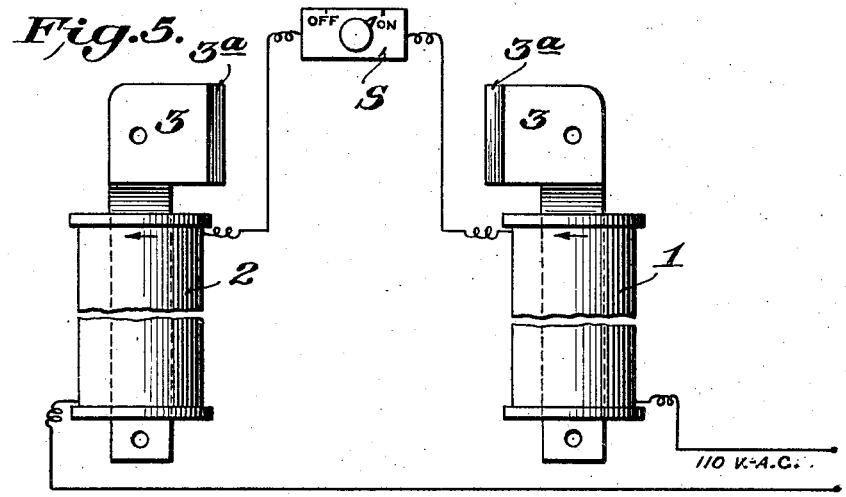
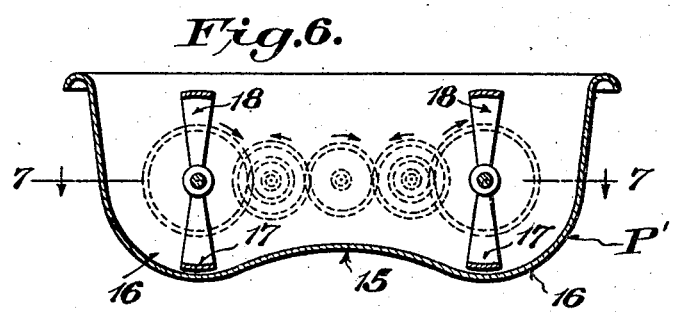
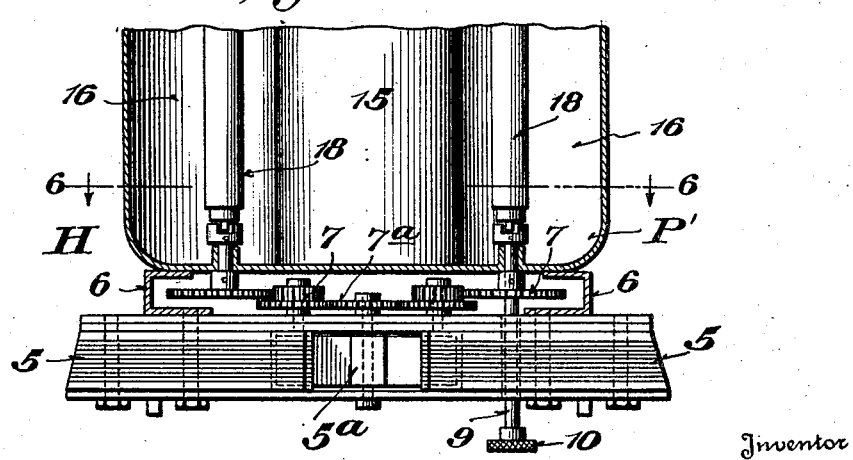

May 7, 1935. C. T. HOFFMAN 2,000,023
ICE CREAM FREEZER FOR REFRIGERATORS
Filed July 11, 1932 4 Sheets—Sheet 4
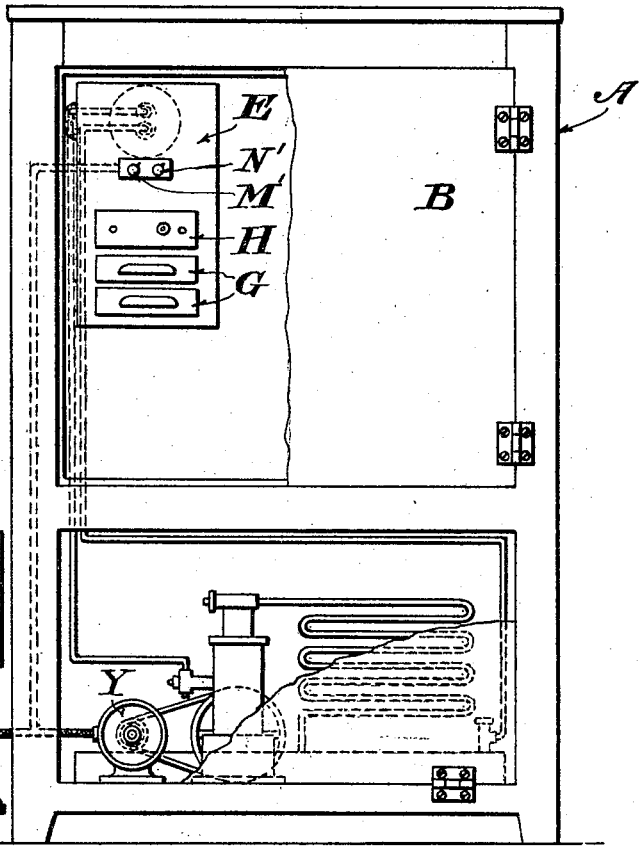
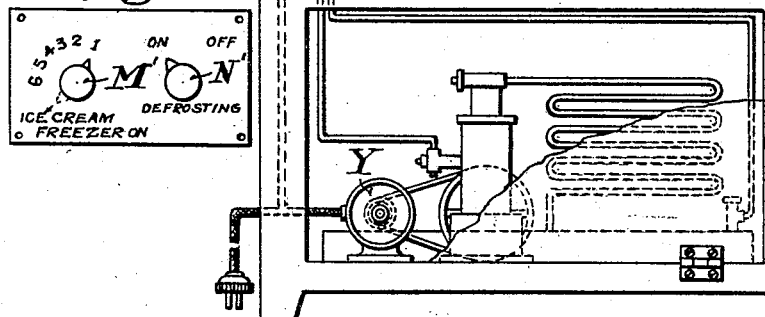
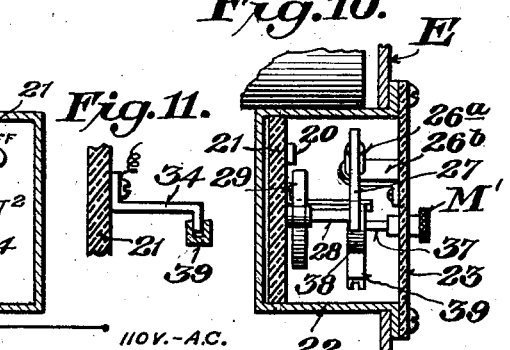
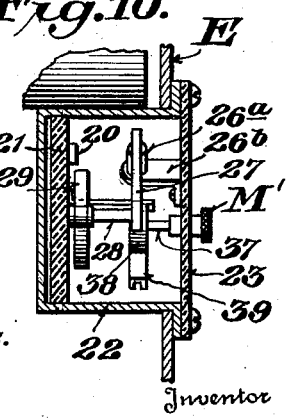
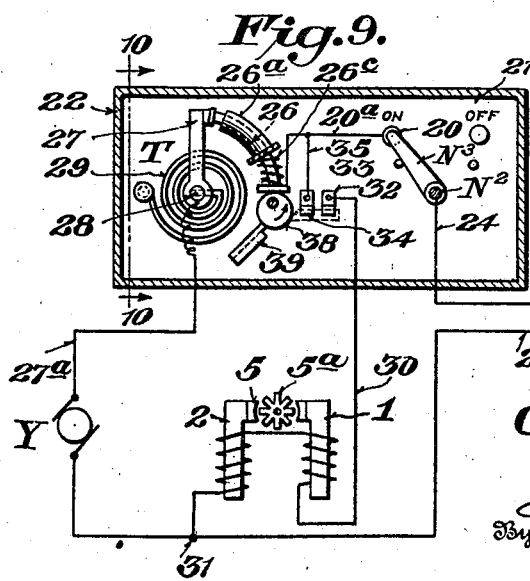
Inventor
Charles T. Hoffman, Patented May 7, 1935

2,000,023

UNITED STATES PATENT OFFICE 2,000,023

ICE CREAM FREEZER FOR REFRIGERATORS

Charles T. Hoffman, Washington, D. C., assignor, by direct and mesne assignments, to Emory L. Groff, as trustee Application July 11, 1932, Serial No. 621,988

16 Claims. (Cl. 62—116)

This invention relates to ice cream freezers of the type adapted to be used in domestic mechanical refrigerators and has special reference to improvements from the standpoint of manufacture, assembly, and convenience of operation.

One of the objects of the invention is to provide a novel motor assembly which readily adapts itself to the type of face plates of standard evaporator units; that is, face plates of the general form and dimensions of those now generally in use. In that connection the invention contemplates the provision of separate electromagnets so arranged as to be readily fitted to the standard type face plate at any desired location thereon with reference to the ice pan emplacements, thereby readily to permit the use of an ice cream freezing pan equipped with pole pieces and a rotor, which pole pieces constitute in effect a continuation of the electromagnets for the purpose of furnishing electromotive power to the rotor with the use of commercial alternating current in the coils. The arrangement set forth also provides for readily utilizing the space on the face plate above the ice pan emplacements for the ice cream freezer control as well as the controls for modifying the operation of the refrigerating apparatus.

Another and distinctive object is to provide a combination ice cream freezer control switch and manually adjustable cold control means which simplifies the operation in the respect that the mere act of turning the ice cream freezer control switch on also operates the means for obtaining increased cold at the evaporator. That is to say, when the cold control knob or button is turned to produce increased cold conditions in the refrigerator, the ice cream freezer circuit will be automatically closed.

Another object is to provide means to assist the magnetic rotor to assume synchronous speed upon manual launching thereof without the need for a specially provided friction-inertia member. That is to say, in the present invention the functions usually performed by such element are performed by the dasher means operatively connected with the rotor, together with an intervening gear train, whereby there is obtained the necessary inertia or balancing effect for assisting the rotor when manually launched, to settle into step with the magnetomotive pulsations produced by commercial alternating current in the electromagnets when such launching is terminated out of step with said pulsations.

A further object is to provide dashers which may be readily removed and reinserted in operative position in the container for freezing the mixture.

A still further object is to provide a special pan construction having particularly in view a scraping action as well as agitating and stirring action, whereby corner pockets will be avoided and all of the contents of the pan will be readily agitated and stirred. As will be more apparent as the invention is better understood, the dasher elements cooperate with the specially formed pan bottom and sides so that the material scraped and impelled by one dasher will be thrown into the path of operation of the other dasher thereby adequately to agitate and stir the mixture.

A preferred and practical embodiment of the invention is shown in the accompanying drawings in which:—

Figure 1 is a detail view of a portion of a mechanical refrigerator with parts broken away to illustrate the application of the invention.

Figure 2 is an enlarged detail view illustrating the motor assembly and freezing pan disassociated from the face plate.

Figure 3 is a top plan view of the construction shown in Figure 2.

Figure 4 is a detail cross sectional view taken on the line 4—4 of Figure 3.

Figure 5 is a diagrammatic view illustrating the electric circuit, as well as the electromagnetic pole pieces which engage with the detachable pole pieces on the freezing pan.

Figure 6 is a vertical cross sectional view taken on the line 6—6 of Figure 7.

Figure 7 is a horizontal sectional view taken on the line 7—7 of Figure 6.

Figure 8 is a diagrammatic view of a mechanical refrigerator showing the embodiment of the invention which contemplates the combination of the ice cream freezer switch with the cold control means.

Figure 9 is a diagrammatic view illustrating the mechanical manual control elements constituting the cold control switch and the ice cream freezer switch and the circuits involved.

Figure 10 is a detail vertical sectional view taken on the line 10—10 of Figure 9.

Figure 11 is a detail view of the circuit closing element in the combined ice cream freezer switch and cold control switch.

Figure 12 is a detail view of the face plate or switch panel of the refrigerator controls used in the present invention.

Similar reference characters designate corresponding parts throughout the several figures of the drawings.

In the embodiment shown in the drawings, the usual refrigerator cabinet is designated generally as A, the same being provided with the door B for closing the cooling compartment C. The latter has mounted therein the usual evaporator or cooling unit D covered by the typical front piece or face plate E. In accordance with the usual practice, the evaporator is provided with one or more ice pans G fitting into suitable compartments, one of which may be used to receive the ice cream freezer which is in the form of a pan generally conforming to the characteristics of an ice pan. The ice cream freezer, including the rotor, divided pole pieces, and pan, is designated generally as H and is shown in the upper compartment of the evaporator. It will, of course, be understood that when it is not desired to make ice cream, this compartment may be fitted with one of the standard ice pans G. However, when it is desired to make ice cream, the freezing mixture is simply placed in the pan of the ice cream freezer and the entire unit slipped into place in the evaporator compartment whereupon portions of the motor carried by the pan contact with suitable pole pieces so that when the current is supplied to induce electromagnetism at the pole pieces the motor will proceed to function in the manner hereinafter described more in detail.

In the illustration of Figure 1 it will be observed that the face plate E is provided with an ice cream freezer switch device designated generally as S and may also be provided with the cold control knob or handle M and the defrosting and indicator switch N. In Figure 1 the ice cream freezer control switch S is shown as being on the same panel or plate E with the knob M and indicator N but disassociated in a mechanical and electrical sense. However, the present invention contemplates not only the feature of locating all of these elements on the same plate or panel within the cooling compartment, namely, on the face plate of the evaporator, but also to interconnect and consolidate the ice cream freezer switch and cold control means so that they function together under one manual operation, as shown in Figure 9.

It will be observed that the present invention contemplates the provision in substantially fixed relation to the evaporator D of a plurality of electromagnets 1—2, the salient poles 3—3 of which are so disposed as to project from pole to pole a field of magnetic flux at the ice pan receptacle. If the electromagnets 1—2 are energized by alternating current with the ice cream freezer H and its associated pole pieces 5—5 and rotor 5a removed from such receptacle, the pulsating magnetic flux will proceed from pole to pole of the electromagnets across a path of substantially maximum reluctance. The path for the magnetic flux under this condition is an air path or its equivalent and therefore a path of maximum reluctance to the extension of the magnetic flux, inasmuch as all parts of the evaporator under the proposed construction are of non-magnetic metal or material, and it is well known that non-magnetic metals or materials offer the same reluctance to electromagnetism as air. Thus it will be apparent that when the ice cream freezer H is inserted in the receptacle at the evaporator D, with the pole pieces 5—5 and rotor 5a of magnetic metal disposed between the poles 3—3 of the electromagnets, the reluctance of the path to the extension of the magnetic flux from pole to pole will be reduced, and it is the purpose of this invention to utilize this principle of reducing the reluctance to the path of the magnetic flux from pole to pole of the electromagnets to lead the pulsating magnetic flux to an effective location to operate by a magnetic rotor of a synchronous motor agitating and stirring means in a liquid container when such container is inserted in the receptacle of the evaporator.

Referring now more in detail to the features of construction involved (Figures 1 and 2), particularly with reference to the motor assembly for actuating the dasher means of the ice cream freezer H, it will be observed that the rear face of the face plate E is provided with electromagnets 1 and 2, the same being provided with the pole pieces 3—3, which may be secured to the face plate by suitable fastenings 4 so that the beveled faces 3a of the pole pieces will lie in the path of the pole pieces 5—5 carried by the pan P of the ice cream freezer. These electromagnetic pole pieces may be readily fitted to the inside face of any standard shaped face plate, which is preferably made of non-magnetic material. In the arrangement shown the pole pieces are so disposed as to cooperate with the upper pan compartment or receptacle of the evaporator. It is obvious, however, from the nature of the construction that they may be installed at the location of any of the pan compartments depending upon the selective choice of the user of the refrigerator.

At this point it may be noted with reference to the electromagnets 1 and 2 that the pole pieces 3—3 thereof adapted to contact with the pole pieces 5—5 carried by the pan P must be simultaneously of opposite polarity at each half cycle of each alternation of the alternating current applied thereto in order that said pole pieces 3—3 will attract each other through the pole pieces 5—5 when the ice cream freezer is placed in operative position in the selected evaporator compartment. The preferred method of accomplishing this result is to wind both coils of the electromagnets in the same direction, as indicated by the arrows in Figure 5, and so lead the current to the coils that the flow of current at each half cycle of alternation will be in the opposite direction through one coil from that in the other. By connecting the coils in series, as shown in Figure 5, and by having the coils wound in the same direction, the pole pieces 3—3 will always be of opposite polarity, that is, one of said poles will be "north" at the same time the other is "south", and vice versa, upon each half cycle of alternation of the alternating current applied to the coils, and hence will attract each other upon each pulsation of the magnetic flux through the pole pieces 5—5 when the ice cream freezer is in operative position in the evaporator compartment.

The pole pieces 5—5 carried by the pan P of the ice cream freezer are preferably carried by a suitable frame or housing 6, which is in turn carried by the pan P and serves not only as a support for the pole pieces 5—5 but also as a housing for the gearing designated generally as 7 for operating the dashers 8. It will, of course, be understood that the gearing 7 includes a gear or pinion 7a which is directly associated with the shaft of the rotor 5a of the motor, and the stub shaft of one of the dasher elements 8 (Figure 3) is continued through an opening in one of the pole pieces 5, as indicated at 9, to receive a manual launching knob 10. From this arrangement it will be apparent that the launching of the rotor 5a may readily be effected by turning the knob or handle 10 of the shaft 9 in either direction, since the movement imparted by this action will be transmitted to all of the gearing which is directly connected with the rotor.

In connection with the launching of the rotor 5a, it will, of course, be understood, as outlined by the objects of the invention, that no friction-inertia member is necessary due to two features; first, that there is sufficient looseness or play in the teeth of the gearing to assist the rotor in balancing itself into step with the pulsations of the magnetic flux, and, second, because of the novel dasher means which also serve to balance the action of the rotor into step with the pulsations of the magnetic flux projected across the rotor when the ice cream freezer is in operative position and alternating current is applied to the coils of the electromagnets 1 and 2. I have discovered that the looseness or play in the gear teeth and the novel dasher means employed, or either of these constructional features, produce the desirable balancing effect upon the rotor when manually launched to cause said rotor promptly to assume a steady speed in synchronism with the pulsating flux produced at the poles of the elctromagnets. That is to say, while both of these features may be present in actual construction, either one of them has been found sufficient in practical use to produce the necessary effect with reference to the synchronizing of the rotor into step with the flux pulsations, and any tendency of the rotor to hunt is completely eliminated. I have also discovered that, inasmuch as the magnetic torque on the rotor at the time of manual launching is greatly in excess of the useful as well as the frictional load, due to the provision for power torque on the rotor to meet the greatly increased load which occurs when the freezing mixture advances toward congealment, such excess magnetic torque on the rotor has vital influence on the ease with which the rotor may be launched manually with the immediate assumption by the rotor of synchronous speed in step with the flux pulsations.

In connection with the novel dasher units designated generally as 8, it will be observed that the dasher or paddle elements proper are designated generally as 8a and are provided with the central shaft portion 8b, one end of which is provided with a socket 8c for receiving a supporting spindle 11. This spindle is preferably slidably mounted in a suitable sleeve provided on the pan and is formed at its outer end with an interiorly threaded nut portion 12 adapted to engage with a mating exterior thread of the sleeve. By rotating the nut 12 the spindle may be shifted in either direction longitudinally in the sleeve to engage in the socket 8c and thus lock the dasher in place, the opposite end of the dasher having a novel key arrangement for connecting with the gear shafts, as will presently appear. This arrangement also provides a fluid tight bearing for one end of the dasher shaft. The opposite end of the dasher shaft is provided with a key 13 adapted to be placed in a slot 14 formed in the end of one of the shafts which form a part of the gear train 7. As will be observed from the drawings, the keys 13 have a relatively loose fit in the slots 14 so that relative play is permitted to a certain extent between the dasher shaft and the shafts with which the gears are connected. When the teeth of the gears constituting the gear train fit relatively close, it has been found that the play afforded by the key and slot arrangement 13—14 will be sufficient to dampen the oscillatory variations from a steady motion in the magnetic rotor; in other words, effectively preventing what is known as hunting by the rotor and renders possible perfect synchronism being assumed by the rotor following the minimum interval of time following termination of the manual launching operation. This arrangement also assists in producing easy synchronizing of the rotor when launched out of step with the flux pulsations.

The arrangement described provides a readily detachable mounting for the dasher elements 8 so that they may be conveniently removed when the freezing mixture has a proper consistency, thereby to permit the mixture to freeze hard in the usual manner. Furthermore, the detachability of the dashers renders the cleaning of the pan a simple and practical operation. In installing the dashers in the pan it is only necessary to slip the key 13 in the slot 14 and then move the spindle 11 into the socket 8c by manipulating the nut or knob 12 to insure locking of the dasher properly in place.

A modified type of pan as well as a modified type of dasher is shown in Figures 6 and 7. From these figures it will be observed that the pan P' is formed with a novel bottom portion which is particularly designed to avoid pockets at the corners of the pan so that all of the mixture to be frozen will be subject to the action of the dashers. As will be observed from Figure 6, the bottom of the pan is centrally arched as at 15, while the corners 16 are rounded to conform substantially to the path of movement of the blades 17 of the dasher elements 18. The blades 17 are preferably formed from stamped metal with the ends thereof which connect with the dasher shafts being of substantially sector shaped formation. This design of the blade provides in effect a knife edge which materially assists in the scraping action accomplished by the dasher blades with reference to the rounded walls 16 of the pan. As will be apparent from Figure 6, the dasher elements 18—18 operate in the same directions so that the mixture thrown off from one dasher will be moved over into the path of the other dasher, thereby assisting in the formation of a complete circuit for the mixture being frozen. While this action is also present with the dasher arrangement shown in Figures 3 and 4, nevertheless the rounded formation at the bottom corners of the pan together with the arched central formation shown in Figures 6 and 7 especially contribute to a thorough mixing of the ingredients or contents of the pan, as well as cutting the mixture during the freezing process.

Referring further to the means for controlling the circuit to the electromagnets, it has been previously explained that the electric circuit arrangement shown in Figure 5 includes the ice cream freezer switch S. When the handle or knob of the switch is turned to the "On" position it will be apparent that the circuit is closed to the magnets, and when the handle of the switch is turned to the "Off" position the circuit will be broken. This same result may be accomplished with the arrangement shown and described in Figures 8 to 12 inclusive, with the added advantage that when the cold control means is turned to produce the lowest possible temperatures necessary to freeze mixtures of high specific gravity, the circuit to the ice cream freezer motor will be automatically turned on.

Figure 8 illustrates diagrammatically a standard type refrigerator equipped with the evaporator, compressor, condenser, and motor for operating the compressor, including necessary auxiliary valves for maintaining a proper flow of a refrigerant element to produce at the evaporator the necessary cold conditions to refrigerate the cooling compartment by the removal of heat therefrom, and also thermal means for maintaining the evaporator within predetermined temperature limits, which thermal means is adjustable to obtain at the will of the user lower temperatures by the manually adjustable selective settings of said thermal means. The refrigerator thus illustrated contemplates a compressor having a capacity, in conjunction with relative large capacity of the associated refrigerating elements and mechanism, to produce cold conditions at the evaporator greatly in excess of that required to maintain the cooling compartment at the proper temperature at the slowest freezing speed of the apparatus. That is to say, the capacity of the compressor and auxiliary refrigerating equipment is such that at normal operation the compressor operates only a fraction of the time, whereas when increased cold conditions are desired at the evaporator the compressor may be caused to operate for a greater portion of any period of time taken as an example. Whether the compressor operates to produce refrigeration during a minimum active cycle or the maximum active cycle or any intermediate degree of activity depends upon the setting of the manually adjustable temperature control means.

Thus, the invention contemplates the provision of means for rendering the ice cream freezer operative simultaneously with the bringing into play of the means for modifying the operation of the means for maintaining the evaporator within predetermined temperature limits to produce subnormal cold conditions at the evaporator necessary to freeze heavy cream mixtures.

Referring to Figure 8, as previously indicated, the face plate E of the evaporator is provided with the defrosting switch N', which, as will be observed from Figure 9, is included in the motor electric circuit and has the "On" and "Off" positions indicated in the latter figure. When it is desired to defrost the ice forming unit in the cooling compartment of the refrigerator, the switch including the knob N' is turned to the "Off" position, but when the refrigerator is in normal use the switch N'—N2—N3 remains in the "On" position.

The contact for the "On" position is designated as 20 and carried by an insulated block 21 mounted in the housing 22 and which latter is in turn provided with an insulating cover 23. This cover is secured to the face plate E by screws or equivalent fastenings and in addition to carrying the temperature selector designated generally as M', as will be presently described, permits the handle or shaft N2 which carries the knob N' of the switch to project through the same for the purpose of manipulation.

The arm N3 of the switch N'—N2—N3 is electrically connected by the wire 24 with one side of the alternating current line which supplies the motor Y with power, the other side of the circuit being indicated by the line 25. When the arm N3 is in engagement with the contact 20, current will pass to the motor Y as follows: first, over the line 20a which is connected to a metallic arcuate contact member 26 slidably mounted in the sleeve 26a carried by the bracket 26b fixed on the insulating cover 23, and thence to the metal arm 27 which is a part of the thermostat T. This metal arm 27 is mounted on a shaft 28 connected with a bimetallic spiral thermostatic element 29 so that the arm 27 will be readily responsive to cold conditions at the evaporator. Thus, current passes through this arm 27 and its shaft 28 which is electrically connected by the wire 27a with the motor Y. And, as previously indicated, since the motor is connected with the return wire 25, it will be apparent that the motor will operate under normal conditions when the arcuate contact 26 and the arm 27 are in engagement. In other words, each time the box warms up to the predetermined degree, the contacts 26 and 27 come together and close the motor circuit so long as the switch arm N3 is engaged with the contact 20. This is descriptive of normal box operation, that is, operation of the refrigerator without stepping up the cold control means. When it is desired to obtain increased cold conditions at the evaporator the knob or equivalent member M' may be turned counter-clockwise from the position "1" on Figure 12 to any selected station or position regardless of whether the ice cream freezer is in use or not. This is accomplished through the turning of the knob M' connected by the shaft 37 with the insulated cam 38 which is engaged continuously by the arcuate arm 26 due to the spring 26c. Thus by adjusting the knob M' any degree of cold can be selected at will. This type of cold control means is shown by way of example, to illustrate how selective cold conditions can be obtained within any desired limits, and it will, of course, be understood that its equivalent may be used in conjunction with the feature of automatically turning on the ice cream freezer at a stage of cold selection, without departing from the invention. However, before proceeding further with a description of the temperature selector feature in conjunction with the ice cream freezer switch, it will be noted that the electromagnets 1 and 2 (Figure 9) of the ice cream freezer motor circuit are included in a shunt circuit 30 which is connected as at 31 with the return line 25 and also connected as at 32 with a contact arm 33 mounted on the insulating block 21. Adjacent to the contact arm 33 is another contact arm 34 which is connected by the wire 34 with the line wire 24.

When it is desired to obtain increased cold conditions at the evaporator and simultaneously connect the shunt circuit 30 of the ice cream freezer with the main lines 24 and 25, it is only necessary to rotate the temperature selector knob M', whose shaft 37 carries the insulated cam 38 previously mentioned, to its maximum counter-clockwise position. This cam is provided with a circuit closing member or blade 39 adapted to bridge the contacts 33 and 34 when the knob M' is rotated sufficiently, in the direction set forth, to bring the blade 39 into the dotted line position shown in Figure 9. The effect of moving the knob 36 to close the shunt circuit 30 to the ice cream freezer motor is to also rotate the cam 38 thereby to move the arcuate contact member 26 against the tension of the spring 26a so as to move the end of the contact 26 which engages the arm 27 further toward the left in Figure 9 to effect a lower temperature setting. By moving the arcuate contact 26 and the arm 27 further toward the left it will be apparent that the circuit to the motor Y will be maintained closed over the same path as previously described, for a greater length of time to maintain a longer active operating cycle of the motor and compressor with resulting increased cold conditions at the evaporator. As increased cold conditions occur at the evaporator, it will be apparent that the thermostat element 29 will move the arm 27 away from the end of the arm 26 and temporarily break the motor circuit until the temperature of the box again rises to a point where it is necessary to restore the motor circuit. This intermittent action of the motor under the influence of the temperature selector elements produce prolonged periods of active mechanical cycles thereby to maintain increased or lowered cold conditions to effect freezing of the mixture in the ice cream freezer.

From the foregoing it will be understood that the closing of the shunt circuit 30 for the ice cream freezer motor will simultaneously and automatically adjust the thermostat T to effect increased cold conditions at the evaporator. When it is desired to turn the ice cream freezer circuit off, it is only necessary to turn the knob M' clockwise away from the "On" position which appears on the face plate 23 as shown in Figure 12 so that the pointer on the knob or handle M' will register with any one of the indicated freezing speeds shown by the scale numbered "1 2 3 4 5 6". Thus the ice cream freezer circuit will be broken but increased cold may be maintained to further freeze the cream mixture.

It will accordingly be apparent that the present invention provides not only convenient means for assembling the electromagnets with reference to the ice cream freezer pan location, but also through the use of the novel pan and dasher elements disclosed permits of a thorough mixing of the contents of the pan, while, at the same time, when the mixture has reached the proper stage of congealment the dashers may be readily removed by lifting them out of the pan so that the latter may be placed back in the evaporator compartment for hardening. Also by reason of the single control provided for the temperature selector means and the ice cream freezer switch the mere act of operating a single control permits the user to start the freezer in operation and at the same time avoids omission to properly set the temperature selector to produce increased cold conditions necessary to freeze ice cream mixtures by the mere act of turning the ice cream freezer on. With this arrangement there is no possibility of the user of the refrigerator being disappointed in obtaining a frozen mixture, as might be the case where the changing of the temperature selector might be overlooked when the ice cream mixture is inserted and the freezer turned on by separate means.

It will, of course, be understood that the cores of the electromagnets 1—2 are of laminated magnetic metal, as are also the pole pieces 5—5 and rotor 5a. This metal will be subjected to intense moisture conditions in use, and if such metal is the usual iron or steel used in the construction of motor parts of this character it will rust. Rusting may be prevented by having this metal nickeled or chromium plated. The preferred method of preventing the rusting or corrosion of the laminated portions of the motor, however, is to use in their construction what is commercially known as "Stainless" steel, which steel has been found to have satisfactory magnetic qualities and is rustproof.

Without further description, it is thought that the several features and advantages of the invention will be readily apparent, and it will, of course, be understood that changes in form, proportion, and details of construction may be resorted to without departing from the scope of the appended claims.

I claim:

1. In a refrigerator having an evaporator provided with pan compartments, a face plate for the evaporator, electromagnets fitted to the face plate at a pan compartment location of the evaporator, a pan for the mixture to be frozen adapted to be inserted in one of said compartments, a rotor and divided pole pieces carried by said pan, said pole pieces being adapted to contact with the electromagnets.

2. In a refrigerator having an evaporator provided with pan compartments, a face plate for the evaporator, separate electromagnets fitted to the face plate at each side of a pan compartment location of the evaporator, a pan for the mixture to be frozen adapted to be inserted in one of said compartments, a rotor and divided pole pieces carried by said pan, said divided pole pieces being magnetically coupled with the electromagnets.

3. In a refrigerator, an evaporator provided with pan compartments, a face plate for the evaporator having a control panel portion and an opening for permitting access to said compartments, electromagnets fitted at each side of said opening at the location of a compartment and clear of the said control panel portion thereof, a circuit including said electromagnets, a switch also in said circuit and mounted on the panel portion of the face plate, a pan for the mixture to be frozen adapted to be inserted in one of said compartments, a rotor and divided pole pieces carried by said pan, and said pole pieces being magnetically coupled with the electromagnets.

4. In a refrigerator, an evaporator having pan compartments, a face plate adjacent the end of said compartments, electromagnets carried by the face plate and provided with pole pieces, a pan insertible in one of said compartments, a rotor and pole pieces carried by the pan, said latter pole pieces being adapted to engage with the pole pieces of the electromagnets, and inertia means for the rotor comprising dasher elements operatively connected with the rotor.

5. In a refrigerator, an evaporator having pan compartments, a pan having dasher means therein and insertible in one of said compartments, a face plate adjacent one of said compartments, electromagnets carried by the face plate and provided with pole pieces, a pan insertible in one of said compartments, a rotor and pole pieces carried by the pan, said latter pole pieces being adapted to engage with the pole pieces of the electromagnets, and inertia means for the rotor comprising gearing operatively connected with the rotor.

6. In a refrigerator, an evaporator having pan compartments, a face plate adjacent the end of said compartments, electromagnets carried by the face plate and provided with pole pieces, a pan insertible in one of said compartments, a rotor and pole pieces carried by the pan, said latter pole pieces adapted to engage with the pole pieces of the electromagnets, and inertia means for the rotor comprising interconnected dasher elements and gearing operatively connected with the rotor.

7. In a refrigerator, an evaporator having pan compartments, a pan adapted to be fitted in one of said compartments, motor elements carried by said pan, control means for maintaining the evaporator within predetermined temperature limits, temperature selector means for modifying the operation of said control means, and means for manually adjusting said temperature selector to obtain a lower temperature at the evaporator and simultaneously rendering said motor elements operative while maintaining said control means in operation.

8. In a refrigerator, an evaporator having pan compartments, means for maintaining the evaporator within predetermined temperature limits, control means for modifying the operation of said last named means to obtain subnormal cold conditions at the evaporator, a pan adapted to fit in one of said compartments, motor elements carried by the pan, dasher means in the pan operatively connected with the motor elements, and a single manually adjustable member for simultaneously adjusting said control means and rendering the said motor elements operative while maintaining the control means in operation.

9. In a refrigerator, an evaporator having pan compartments, control means for maintaining the evaporator within predetermined temperature limits, a freezing pan insertible in one of said pan compartments, motor elements carried by the pan, dasher means operatively connected with said motor elements, temperature selector means for modifying the operation of said control means, and a common manually adjustable device for simultaneously adjusting the temperature selector and rendering said motor elements operative while maintaining said control means in operation.

10. A refrigerating system comprising in combination, a cooling element including a freezing compartment, refrigerant medium circulatory mechanism adapted to maintain the cooling element at normal refrigerating temperatures and also to maintain the cooling element at varied temperatures substantially below normal refrigerating temperatures to accelerate the freezing of ice cream mixtures, means for adjusting the refrigerant medium circulatory mechanism to render said mechanism operable to maintain the cooling element at lower freezing temperatures, and an ice cream mixture freezing container adapted to fit in said freezing compartment of the cooling element and including motor actuated agitating means rendered operable coincident with the adjustment of the refrigerant medium circulatory mechanism to obtain a lower temperature.

11. A refrigerating system comprising in combination, a cooling element including a freezing compartment, refrigerant medium circulatory mechanism adapted to be started and stopped at predetermined high and low temperature limits to maintain the cooling element at normal refrigerating temperatures and also to be started and stopped at a plurality of other high and low temperature limits to maintain the cooling element at varied temperature substantially below normal refrigerating temperatures to accelerate the freezing of ice cream mixtures, adjustable control means for starting and stopping said mechanism to maintain normal refrigerating temperatures at the cooling element, means for adjusting said control means to maintain at the cooling element accelerated ice cream mixture freezing temperatures, and an ice cream mixture freezing container adapted to fit in the freezing compartment of the cooling element, said container including motor actuated agitating means whereby the mixture is rendered more responsive to the accelerated freezing temperatures of the cooling element.

12. In an electrical refrigerator, an evaporator having freezing compartments, means for circulating a refrigerant through the evaporator, means for selectively maintaining the evaporator within predetermined variable temperature limits, a pan adapted to be fitted in any one of said compartments, motor elements carried by said pan, and means for closing the circuit to the motor elements of the pan upon selecting a predetermined variable temperature limit for the evaporator.

13. In an electrical refrigerator, an evaporator having freezing compartments, means for circulating a refrigerant through the evaporator, a control device for maintaining the evaporator within predetermined normal temperature limits and also maintaining the evaporator within predetermined variable temperature limits to obtain a subnormal temperature at the evaporator, a pan adapted to be fitted in any one of said compartments, motor elements carried by said pan, and means for selectively setting said control device to obtain a predetermined subnormal temperature and simultaneously closing the circuit to said motor elements while maintaining the said control device in operation.

14. In an electrical refrigerator, an evaporator having freezing compartments, means for circulating a refrigerant through the evaporator, a control device for selectively maintaining the evaporator within predetermined normal temperature limits and predetermined variable temperature limits to produce subnormal temperatures, a pan insertible in any one of said compartments, motor elements carried by said pan, means for simultaneously setting said control device to cause said means for circulating the refrigerant to operate to produce a subnormal temperature, said means being adapted in one position to close the circuit to said motor elements while maintaining the evaporator within predetermined variable low temperature limits and said means being also adapted to be moved to open the circuit to the motor elements while still maintaining the control device in position to cause the refrigerator to operate within a subnormal temperature range.

15. In a refrigerator, an evaporator having freezing compartments, circulating means for passing a refrigerant through the evaporator, an adjustable control device adapted to be selectively set manually to cause the operation of said circulating means to produce temperatures at the evaporator between predetermined high and low normal and predetermined high and low subnormal temperature limits, a freezing receptacle, agitating means therein, electrically driven motor elements carried by the receptacle to operate the agitating means, and means associated with the control device to close a circuit to the electrically driven motor elements simultaneously with the adjustment of the control device to obtain subnormal temperatures at the evaporator while maintaining the control device effective to produce subnormal temperatures.

16. In a refrigerator, an evaporator having freezing compartments, circulating means for passing a refrigerant through the evaporator, an adjustable control device adapted to be selectively set manually to cause the operation of said circulating means to produce temperatures at the evaporator between predetermined high and low normal and predetermined high and low subnormal temperature limits, a freezing receptacle insertible in any one of said freezing compartments, agitating means therein, electrically driven motor elements carried by the receptacle to operate the agitating means, and means associated with the control device selectively to close or open a circuit to the electrically driven motor elements simultaneously with the adjustment of the control device to obtain subnormal temperatures at the evaporator while maintaining the control device effective to produce subnormal temperatures.

CHARLES T. HOFFMAN.